United States Patent [19]

Sable

[11] Patent Number: 4,884,183

[45] Date of Patent: Nov. 28, 1989

[54] DUAL-MODE CONTROLLED PULSE WIDTH MODULATOR

[75] Inventor: Daniel M. Sable, Blacksburg, Va.

[73] Assignee: General Electric Company, East Windsor, N.J.

[21] Appl. No.: 330,388

[22] Filed: Mar. 29, 1989

[51] Int. Cl.$^4$ .......................................... H02M 3/156
[52] U.S. Cl. ..................................... 363/41; 318/811; 363/98
[58] Field of Search .................... 363/411, 21, 97, 98; 323/284, 286, 271; 318/811

[56] References Cited

U.S. PATENT DOCUMENTS

| | | | |
|---|---|---|---|
| 4,250,544 | 2/1981 | Alley | 318/138 |
| 4,456,872 | 6/1984 | Froeschle | |
| 4,686,617 | 8/1987 | Colton | |
| 4,719,559 | 1/1988 | Sokal et al. | 363/98 |

OTHER PUBLICATIONS

"What a Design Engineer Should Know About Current-Mode Control", by R. Redl et al., pp. 18-33 of the Proceedings of Power Electronics Design Conference, Oct. 15-17, 1985 published by Power Sources Users Conference of Cerrtios, Calif.

"Design Considerations of Current Injection and SCM Control", by R. Ridley, pp. 4.16-4.17 and 4.38-4.46.

Primary Examiner—David Smith, Jr.
Attorney, Agent, or Firm—William H. Meise

[57] ABSTRACT

A pulse width modulated control signal for use in motor control and with power supplies is generated by a dual-mode controller having variable frequency control in a discontinuous current operating mode. The controller also provides control in a continuous current operating mode, and makes a smooth transition therebetween.

4 Claims, 4 Drawing Sheets

DUAL-MODE CONTROLLED PULSE WIDTH MODULATOR

This invention was made with Government support under Contract No. F04701-83-C-0030.

FIELD OF THE INVENTION

The present invention relates to the field of current-injection controlled pulse width modulators, and more particularly, to current-injection controlled pulse width modulators for controlling motors and power supplies.

BACKGROUND OF THE INVENTION

In the control of motors and power supplies it is desirable to use driving circuitry having a pulse width modulated (PWM) signal output. Conventional PWM controllers, for example fixed frequency PWM controllers, regulate power converters by controlling the duty ratio or duty cycle of the power converter via the output voltage. Fixed-frequency PWM controllers can produce significant phase lag between the PWM output signal and the output voltage. Such phase lag typically is caused by the L-C portion of the control-to-output transfer function. Such controllers require careful design to ensure stability and adequate response speed for the various operating conditions which they may encounter.

It has been recognized by Redl, R. et al. in "What A Design Engineer Should Know About Current-Mode Control", printed as part of the *Proceedings of Power Electronics Design Conference*, Oct. 15-17, 1985, pages 18-33, published by the Power Sources Users Conference of Cerritos, CA, USA, that phase lag problems can be overcome through the use of current-mode control rather than voltage control. Current-mode controllers overcome the phase lag problems of voltage control converters by directly commanding the current in the power converter inductor. Such direct command allows the inductor current to instantaneously follow the control input, thus removing the phase lag problem. The prior art recognizes at least five different types of current-mode controllers (a) hysteretic, (b) constant OFF time, (c) constant frequency with turn-on at clock time, (d) constant ON time and (e) constant frequency with turn-off at clock time. Among these, the hysteretic constant OFF time, and constant ON time are variable-frequency. These five types of controllers are used in combination with three basic types of regulated rectangular wave power converters, namely buck, boost and buck-boost. Of the above five current-mode controllers, it has been found that the hysteretic controller is the best in three respects: largest phase margin, freedom from subharmonic oscillations, and well limited short circuit current.

Some variable frequency techniques for PWM establish control of the peak inductor current and always allow the inductor current to return to zero, i.e. they are always in a discontinuous-current mode. Neither the ON (conductive) time nor the OFF (nonconductive) time are fixed. Rather, the ON time is terminated when the sensed current reaches a fixed value. The error signal controls the frequency of operation directly through use of a voltage-controlled oscillator. This type of PWM control exhibits desirable characteristics at light loads. However, this mode of operation is inefficient under heavy load conditions because of the high peak-to-average current ratio. It is also undesirable in motor applications, since the relatively high peak current may tend to demagnetize the rotor. Under heavy load conditions, operation in a hysteretic mode is desirable. In the hysteretic mode, the peak-to-average current ratio is controlled to a lower value than in the variable-frequency controller.

In a typical hysteretic current-mode controller, a voltage representative of the inductor current in the power converter is compared in a comparator with the error signal. The power converter may be the drive circuits for a motor or a switched direct current (dc) power supply. In the power converter, the error signal may be a voltage representing the difference between the commanded value of a parameter and its actual value. Controlled parameters in power supplies may be direct output voltage, or in a motor the controlled parameters may be torque or speed. The comparator renders a power switch in the power converter nonconductive (OFF) when the increasing sensed inductor current reaches a design value which is a predetermined amount above the error signal. The comparator turns the power switch ON again (renders it conductive) when the sensed inductor current decreases a predetermined amount below the error signal. The current difference between the turn-OFF and turn-ON points defines a hysteresis band, which may be symmetrical about a reference value.

Hysteretic current-mode controllers are preferred for heavy inductor current demand conditions, i.e. continuous inductor current conditions, as required, for example, for a motor being started. Hysteretic current-mode controllers may be unsuitable for light inductor current demand conditions, i.e. discontinuous inductor current conditions, as required, for example, by a motor in operation at relatively constant speed. A discontinuous inductor current condition is one in which the inductor current drops to zero during a portion of the operating interval. During such discontinuous modes of operation, hysteretic controllers may be subject to undesirable low frequency oscillations.

A previously suggested solution to the problem of oscillations at low load in hysteretic controllers is the combination of a hysteretic controller with a constant OFF time controller. However, such a combination is undesirable, as described below. The operation of a typical constant OFF time current-mode controller is similar to that of the hysteretic controller, except the power switch is turned OFF for a fixed time period. The ON-time of the power switch is terminated when the voltage representative of the inductor current reaches the value of the error signal. The fixed OFF time of such a controller is accomplished through the use of a monostable multivibrator set to a predetermined time period. Thus the constant OFF time current-mode controller controls the maximum value of the inductor current, while the hysteretic current-mode controller controls both the maximum and minimum values of the inductor current. Both result in variable-frequency operation.

The problem with combining a hysteretic controller with a constant OFF time controller is that the ON time can be so low during light inductor current conditions, i.e. at minimum torque in a motor, that the ON time approaches the storage time of the power transistor of the converter, which may result in an oscillation condition. As mentioned, such oscillations are disadvantageous. Thus, the constant OFF time controller used to alleviate the problems of the hysteretic controller under low load conditions itself has problems at low load. It is therefore desirable to have a current-mode controller which provides stable and efficient operation at all loads.

SUMMARY OF THE INVENTION

An apparatus for generating a pulse width modulated control signal in response to an error signal and a current sense signal includes a combination of a variable frequency discontinuous mode controller and a hysteretic continuous mode controller which transitions between modes in response to load and command conditions.

DESCRIPTION OF THE INVENTION

Figure 1:
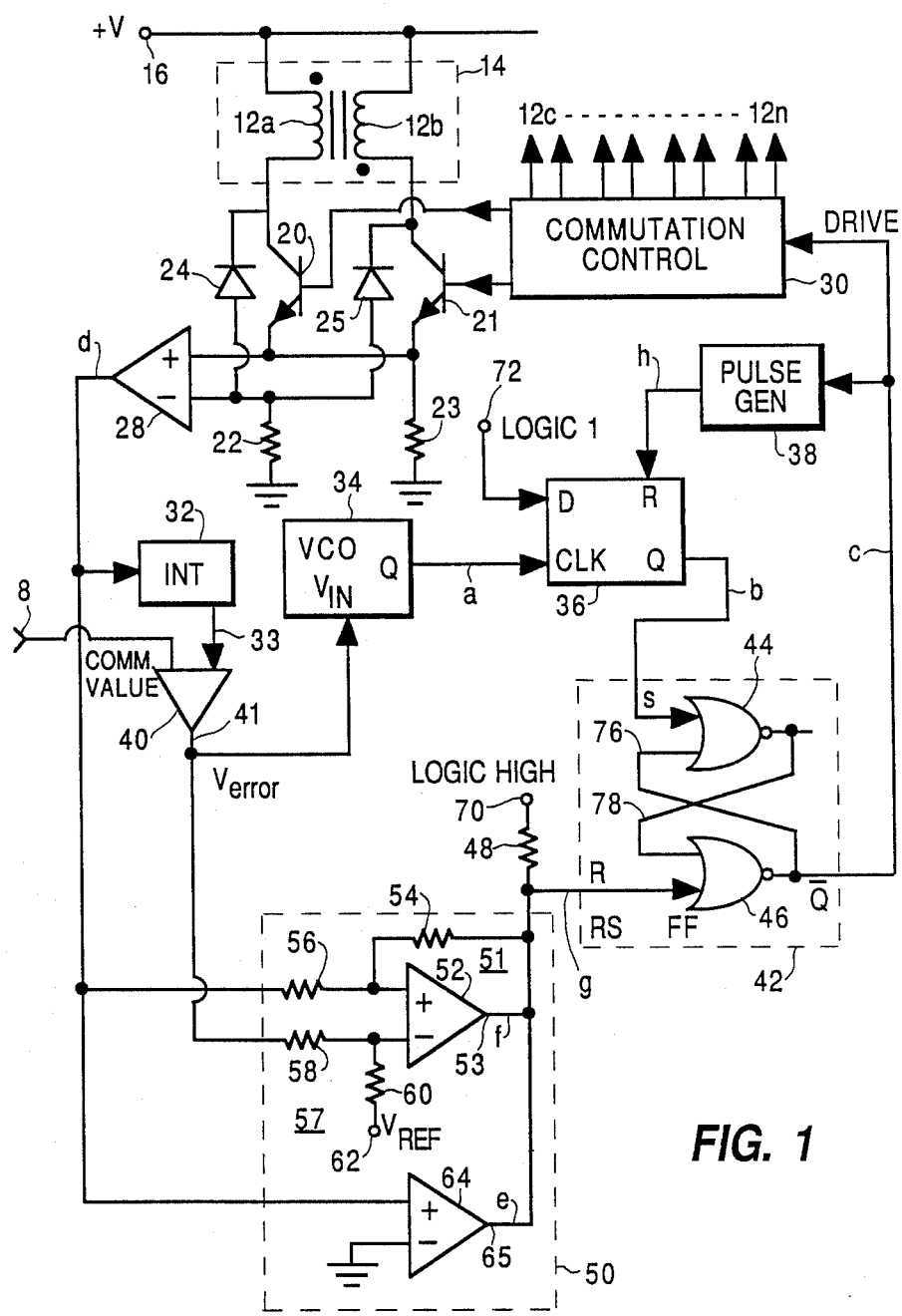
FIG. 1 is a simplified diagram in block and schematic form of a variable frequency pulse width modulator (PWM) connected for controlling the average torque of a polyphase direct current motor.

In FIG. 1, an inductor 12a, which may be, for example, the armature winding of a direct current motor 14, is connected at a dotted end to a terminal 16 for receiving direct voltage +V. At its other end, inductor 12 is connected to ground by way of the collector-to-emitter path of a bipolar NPN switching transistor 20 and a current sensing resistor 23. A damping diode 24 has its cathode connected to the collector and its anode connected to the to ground by a second current sensing resistor 22 for shunting inductor current during those intervals during which transistor 20 is nonconductive or OFF. A second inductor 12b is magnetically coupled to inductor 12a with the polarity of the magnetic coupling indicated by standard dot notation. One end of inductor 12b is connected to terminal 16, and the dotted end is connected to ground by way of the series combination of the collector-to-emitter path of a second bipolar NPN switching transistor 21 and current sensing resistor 23. A damping diode 25 is connected between the collector of transistor 21 and resistor 22 for shunting inductor current when transistor 21 is OFF. A differential buffer amplifier 28 has inputs connected across current sensing resistors 22 and 23 for producing, on a conductor d, signal which is at all times representative of the absolute sum of the instantaneous current through either of inductors 12a and 12b. The output signal of buffer amplifier 28 is applied to an integrator illustrated as a block 32 for integrating the current-representative signal on conductor d to produce on a conductor 33 a signal representative of the average current through either inductor 12a or 12b, which in the context of a motor is representative of the average motor torque. The current-representative signal on conductor d is also applied to a control circuit 50 as described below.

A signal representative of the commanded value of torque is applied from an external source (not illustrated) to an input terminal 8. An amplifier 40 amplifies the difference between the average current signal produced on conductor 33 of FIG. 1 by integrator 32 and the signal representative of the commanded value of torque applied to input terminal 8, to produce an error signal $V_{error}$ on a conductor 41. The error signal is connected to the Vin terminal of a voltage-controlled oscillator (VCO) 34, for controlling the frequency of oscillation of a bilevel signal generated at the Q output terminal of VCO 34. The error signal on conductor 41 is also applied to a control circuit 50 as described below.

The signal on conductor d, which is representative of the instantaneous current through either inductor 12a or 12b, is applied to the noninverting (+) input terminal of a comparator 64 within control circuit 50 of FIG. 1. Comparator 64 has its inverting (−) input terminal connected to a reference voltage illustrated by a conventional ground signal. Comparator 64 is of the "open-collector" type, in which the output terminal 65 assumes an "open circuit" state when the + input is set positive relative to the − input. In the open-circuit state, output 65 may be pulled to a logic HIGH or logic 1 (positive) by an external resistor connected to a source of positive voltage. When the + input is at the same voltage or negative relative to the − input, comparator 64 can also provide a low impedance to the negative rail (which in this case is zero voltage or ground level) so that the output terminal is pulled to a logic low or logic 0 level (negative). Output terminal 65 of comparator 64 is connected by way of a conductor e and pull-up resistor 48 to a reference voltage at a terminal 70 which is representative of a logic HIGH level. Output terminal 65 of comparator 64 is also connected to output terminal 53 of a hysteresis comparator 52, which also receives signal from conductor d, as described below.

Control circuit 50 of FIG. 1 includes a hysteresis circuit designated generally as 51. Hysteresis circuit 51 includes comparator 52, which has the same "open collector" characteristic as comparator 64. Comparator 52 includes an output terminal 53 which is connected by way of a conductor f and by conductor e to output terminal 65 of comparator 64 and to pull-up resistor 48. Hysteresis circuit 51 also includes a regenerative or positive feedback resistor 54 connected between output terminal 53 and the + input terminal of comparator 52, and a further input resistor 56 which couples the instantaneous-current-representative signal on conductor d to the + input terminal of comparator 52. A voltage divider designated generally as 57 and including resistors 58 and 60 is connected between conductor 41 and a $V_{ref}$ terminal 62. Voltage divider 57 couples a portion of the error signal $V_{error}$ from output conductor 41 of comparator 40 to the − input terminal of comparator 52, and also applies a direct offset voltage to the − input terminal.

Conductors e and f of control circuit 50 of FIG. 1 are connected to a conductor g. Control circuit 50, together with pull-up resistor 48, generates signals on conductor g for driving the reset (R) input terminal of an RS flip-flop (FF) 42. Flip-flop 42 includes a first NOR gate 44 cross-coupled by conductors 76 and 78 with a second NOR gate 46. The R input terminal of FF 42 is coupled to an input terminal of NOR gate 46, and an S input terminal of FF 42 is connected to an input terminal of NOR gate 44. The output of NOR gate 46 is coupled to the Q̄ output of FF42 and to a conductor c. Conductor c carries drive instructions for switching transistors 21 and 24 from FF 42 to a commutation control circuit illustrated as a block 30. A pulse generator illustrated as a block 38 also receives signals from FF 42 by way of conductor c.

As mentioned, inductors 12a and 12b represent two windings of a polyphase motor 14, which may have multiple other similar pairs of windings controlled by other pairs of switching transistors. Commutation control 30 responds to the rotational position of the rotor of the motor relative to the stator to select the winding pairs to be energized and, within each winding pair, that winding (such as 12a or 12b) which from moment to moment is to be energized by rendering the associated switching transistor (such as 20 or 21) conductive. Thus, the bilevel signal produced on conductor c by FF 42 may be considered to be the base drive signal for one or the other of bipolar transistors 20 or 21, as selected by commutation control 30.

Pulse generator 38 receives the drive pulses on conductor c and responds to the positive-going edges to produce corresponding pulses on a conductor h. Pulse generator 38 may be simply an R-C differentiator. The pulses produced by pulse generator 38 on conductor h are applied to the reset (R) input terminal of a "D" type FF 36. Flip-flop 36 has its data (D) input terminal coupled to a voltage representative of a logic HIGH or a logic 1 level at a terminal 72. A clock (CLK) input terminal of FF 36 receives variable-frequency clock signals from the Q output terminal of VCO 34 by way of a conductor designated a.

In operation, the arrangement of FIG. 1 operates in a discontinuous motor current mode at light loads and in a continuous motor current mode under heavy load conditions. A discontinuous current is one which decreases to zero current for a finite time, while a continuous current is one which maintains a value greater than zero.

Figure 2:
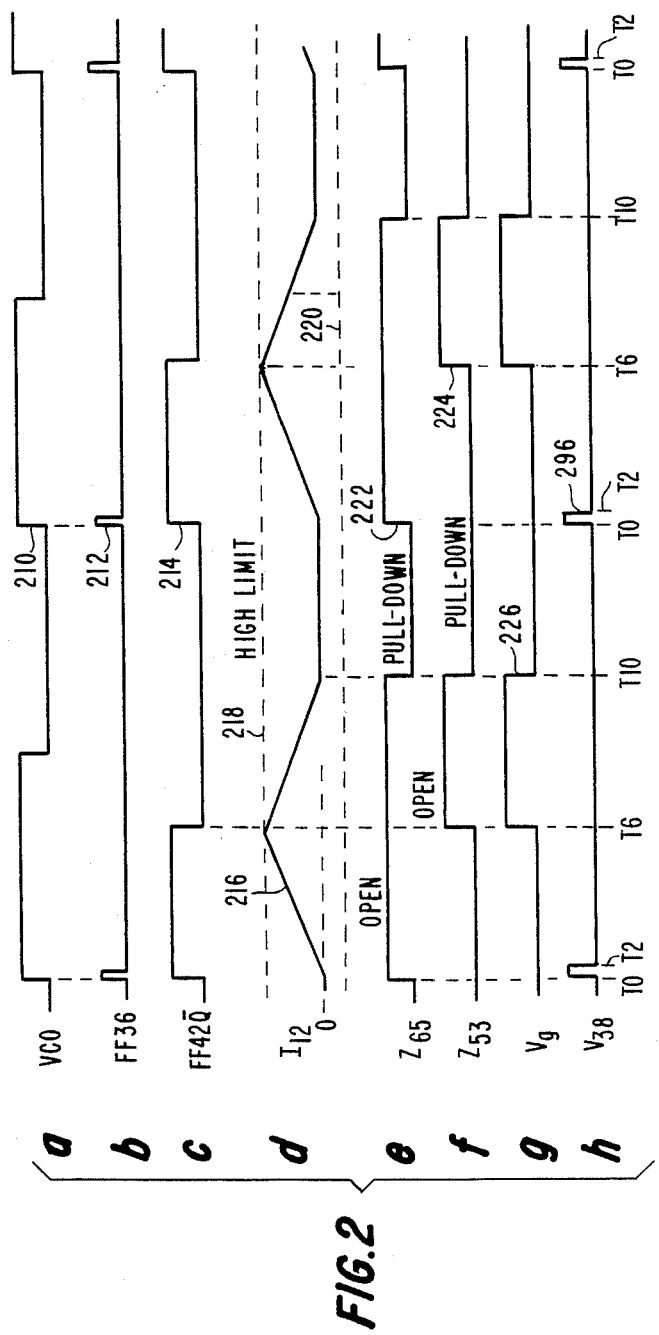
FIGS. 2, 3 and 4 illustrate voltage, current and state waveforms occurring in the arrangement of FIG. 1 during operation under various operating conditions.

FIG. 2 illustrates various voltage, current and state waveforms occurring in the arrangement of FIG. 1 during operation at light load. Under light load conditions, the arrangement of FIG. 1 operates under timing control of the VC0. FIG. 2a illustrates as a waveform 210 the square-wave Q output of VCO 34 of FIG. 1, with a cycle duration extending from a time T0 to the next following time T0. FIG. 2b illustrates a waveform 212 representing the Q output of FF 36 of FIG. 1, which is set to a logic high level at recurrent times T0 in response to the rising edge of the VCO output waveform 210 of FIG. 2a. Flip-flop 36 of FIG. 1 is reset almost immediately, at a time T2, by a pulse illustrated as 296 in FIG. 2h, which pulse is produced by pulse generator 38, in response to setting of RS FF 42. Output signal 212 of FIG. 2b is coupled from FF 36 (FIG. 1) to the S input of FF 42. Flip-flop 42 responds to the logic HIGH level of waveform 212 to switch to its reset state, as illustrated by waveform 214 in FIG. 2c. Waveform 214 makes a positive transition at recurrent times T0 in response to the resetting of FF 42 from the Q output of FF 36.

When signal 214 of FIG. 2c is at a logic HIGH level, as for example immediately after time T0, drive is applied to the base of one of transistors 12a or 12b of FIG. 1 to render the transistor conductive and to cause an increasing ramp of current through one of inductors 12a and 12b. This in turn causes the current-representative voltage on conductor d to begin a ramp increase from a zero volt level, as represented by waveform 216 of FIG. 2d in the interval T0-T6. Current continues to increase through an inductor 12a or 12b until ramp signal 216 of FIG. 2d reaches the upper hysteresis level of hysteresis circuit 51 of FIG. 1. The upper hysteresis level is represented as line 218 in FIG. 2d. This level is established by the magnitudes of resistors 54 and 56, the gain of comparator 52, and the voltage applied to the − input terminal of comparator 52.

For all finite or non-zero values of inductor current as represented in the interval T0-T10 by ramp 216 of FIG. 2d, zero-level comparator 64 (FIG. 1) has a high impedance or OPEN output condition or state, as illustrated by waveform 222 of FIG. 7e. However, so long as comparator 52 is in a pull-down state as represented by waveform 224 of FIG. 2f in the interval T0-T6, the voltage on conductor g cannot rise. At time T6, inductor current 216 of FIG. 2d reaches high limit 218, and hysteresis circuit 52 responds by switching to its open-circuit condition, as illustrated in the interval T6-T10 by waveform 224 of FIG. 2g, whereupon resistor 48 pulls the voltage on conductor g to a logic high level, as illustrated by waveform 226 of FIG. 2. The logic high voltage level on conductor g constitutes a "set to zero" command for FF 42, causing the output of FF 42 on conductor c to drop to a logic low level, as illustrated at and following time T6 by waveform 214 of FIG. 2c.

At time T6, the particular switch selected by commutation control block 30 and controlled by the output of FF 42 on conductor c of FIG. 1 receives no more base drive signal, and becomes nonconductive. With the switch nonconductive, the current in inductor 12a or 12b begins to decrease, as represented by waveform 216 of FIG. 2d just after time T6. The decreasing current does not cause reset of hysteresis circuit 51, because the lower hysteresis band limit, represented by dashed line 220 of FIG. 2d, lies below the value representing zero current. The current 216 ramps toward zero in the interval T6-T10, achieving a value of zero at time T10, as illustrated in FIG. 2d.

When the current in an inductor 12a or 12b of FIG. 1 reaches zero or near zero, as illustrated by waveform 216 of FIG. 2d at time T10, comparator 64 switches its output terminal 65 to its low impedance pull-down state, as represented by waveform 222 of FIG. 2e. When comparator 64 switches to its pull-down state, the voltage Vg on conductor g drops to zero, as illustrated by waveform 226 of FIG. 2g. This has no effect on the output state of FF42, but enables it for control by signal applied to its S input terminal. The pull-down of voltage Vg on conductor g at time T10 causes hysteresis circuit 51 to switch its output terminal 53 to the pull-down mode, as illustrated by waveform 224 of FIG. 2f at and after time T10.

In the discontinuous operating mode at low load, the system remains quiescent until the next following time T0, at which the cycle begins again in response to the rising edge of the output signal of VCO 34 of FIG. 1, as illustrated by waveform 210 of FIG. 1a. The recurrent cycle results in discontinuous current pulses in the recurrent interval T0-T10 which, as mentioned above, have a relatively high peak-to-average value.

Figure 3:
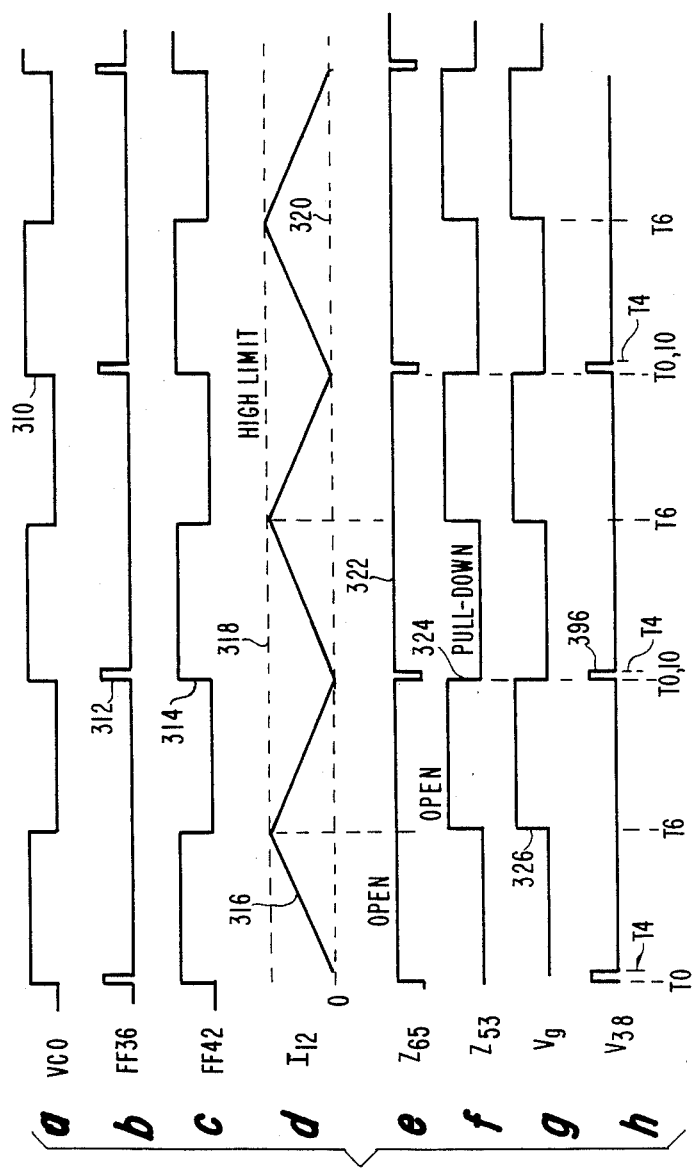

FIG. 3 illustrates current and voltage waveforms occurring in the arrangement of FIG. 1 at a load which is somewhat higher than that illustrated in FIG. 2, which causes an increase in the error voltage produced on conductor 41 of FIG. 1, which increases the frequency of VCO 34 so that the current becomes marginally discontinuous. Waveforms of FIG. 3 corresponding to waveforms of FIG. 2, except for their timing, are designated by the same reference numerals in the 300 series rather than in the 200 series.

In FIG. 3, the frequency of VCO 34 of FIG. 1 has increased relative to that illustrated in FIG. 2 as a result of the change in error voltage. Consequently, the quiescent interval occurring between times T10 and the next following time T0 in FIG. 2 no longer appears. Thus, the times T0 and T10 correspond or are identical in FIG. 8. Since they are identical, they are designated T0/10. At recurrent times T0/10, current representative signal 316 of FIG. 3d just barely decreases to zero current, and immediately begins another cycle of upward ramping. This is still a discontinuous mode of operation, identifiable by the negative-going portions of waveform 322 of FIG. 3e, representing switching of zero-current comparator 64 of FIG. 1.

Figure 4:
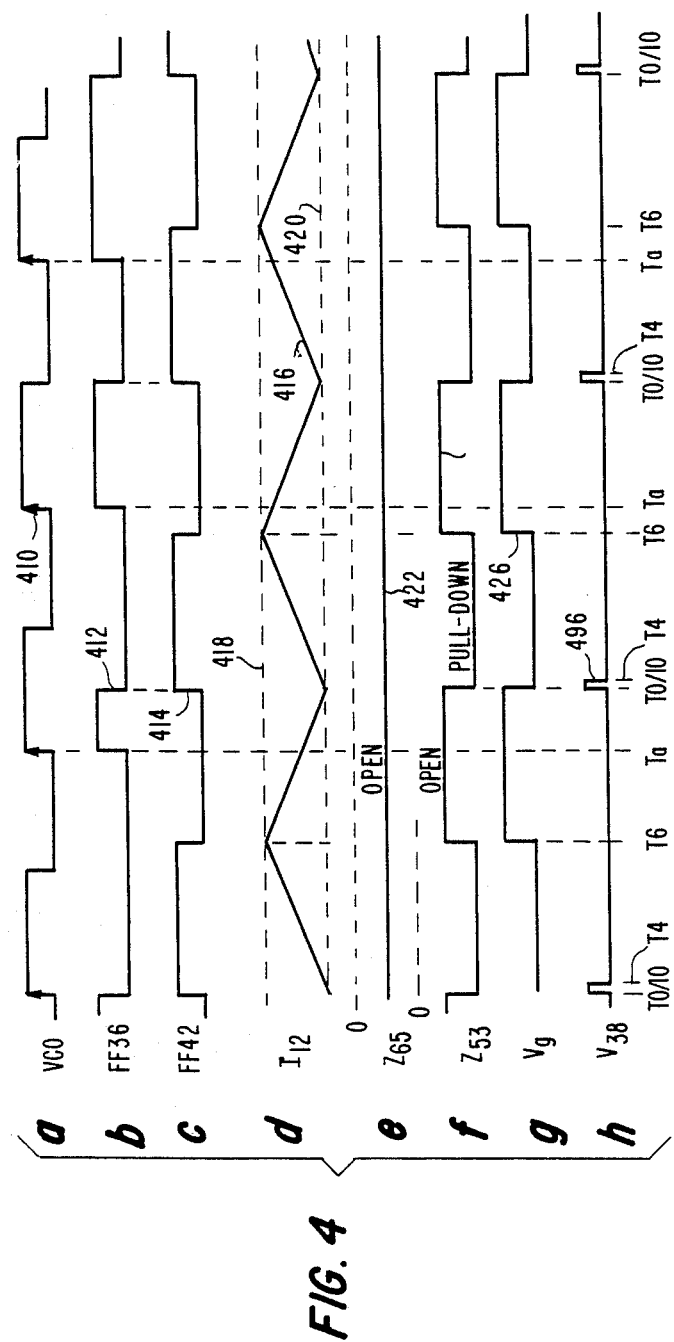

FIG. 4 illustrates voltage and current waveforms in the arrangement of FIG. 1 during a transition from the marginally discontinuous mode of operation illustrated in FIG. 3, to the hysteretic mode, as a result of a further increase in load. In FIG. 4, waveforms corresponding to those of FIGS. 2 and 3 (except for timing and, in some cases, amplitude) are designated by the same reference numerals in the 400 series rather than in the 200 or 300 series.

Under the load and error voltage conditions represented by FIG. 4, VC0 34 has increased its frequency and has lost control of the system operating frequency. Instead, the system operating frequency is controlled by the hysteresis band and by the inductor ramp rate. The inductor ramp rate in turn is determined by the magnitudes of inductors 12a and 12b and the voltage applied to terminal 16 minus the motor back EMF voltage (if any), and to a lesser extent by the magnitudes of current sensing resistors 22, 23, the resistances of the inductors and of transistors 20, 21.

As illustrated in FIG. 4, a complete operating cycle occurs in the interval from time T0/10 to the next following time T0/10. The cycle of VCO 34 is illustrated by the interval from times Ta until the next following time Ta. Times Ta are in general not synchronized with times T0/10, so times Ta "drift" through the cycle established by recurrent times T0/10. For example, at the left of FIG. 4, time Ta lies between times T6 and the next following time T0/10, near the center of FIG. 4 time Ta is near time T6, and on the right of FIG. 4 time Ta lies between times T4 and T6.

During operation, the inductor current represented by waveform 416 of FIG. 4d ramps upward until at time T6 it reaches the hysteresis band high limit of hysteresis circuit 51, represented by dashed line 418 of FIG. 4d. At time T6, hysteresis circuit 51 switches the state of its output terminal 53 to an open-circuit condition, as represented by waveform 424 of FIG. 4f. The inductor current never drops to zero, so the state of output terminal 65 of comparator 64 is also open-collector or high impedance, as represented by waveform 422 of FIG. 4e. Consequently, the voltage on conductor g is controlled exclusively by the state of hysteresis circuit 51. At time T6, therefore, when the output impedance of hysteresis circuit 51 as represented by waveform 424 of FIG. 4f goes high, the voltage Vg on conductor g also goes high, as represented by waveform 426 of FIG. 4g in the interval T6 to T0/10. The logic high level applied to the R input terminal of RS FF 42 beginning at time T6 causes the $\overline{Q}$ output to assume a logic low level. With the $\overline{Q}$ output of FF 42 at a logic low level in the interval following time T6, drive is removed from the power switches and they become nonconductive. Following time T6, therefore, the current in inductors 12a or 12b decreases, as illustrated by waveform 416 of FIG. 4d. The current continues to decrease until the current-representative signal applied to hysteresis circuit 51 of FIG. 1 decreases to the lower hysteresis limit. The lower hysteresis limit is at a value more positive than zero, as represented by dash line 42 of FIG. 4d, as a result of changes in the error voltage due to the heavy load. Before the decreasing inductor current reaches zero, therefore, hysteresis circuit 51 switches to its pull-down state, as represented at and following time T0/T10 by waveform 424 of FIG. 4f. This once again causes RS FF 42 to switch to a mode which provides base drive to the switch transistors, which begins the cycle again.

Thus, the described circuit operates in a discontinuous current mode under low load condition (FIG. 2). As the load increases, the pulses become more frequent until the current pulses recur without intervening interval (FIG. 3). As the load increases further, the hysteresis band, within the limits of which the current ramps oscillate, begins to rise, thereby superposing the current pulses on a continuous current component.

What is claimed is:

1. A power switch drive circuit for causing the average current through an inductor to tend to follow a command signal, comprising:

a controllable power switch including a control input terminal;

an inductor serially coupled with said controllable power switch to form a series circuit, said series circuit being adapted to be coupled across the terminals of a source of voltage for causing an increasing ramp-like current to flow when said switch is conductive;

current sensing means coupled to said series circuit for generating a current-representative signal;

integrating means coupled to said current sensing means for generating a signal representative of the average of said current representative signal;

first comparator means coupled to said integrating means and adapted to receive said command signal for comparing said command signal with said signal representative of the average of said current-representative signal for generating an error signal therefrom;

a voltage-controlled oscillator coupled to said first comparator for generating oscillations at a frequency controlled by the magnitude of said error signal;

a D flip-flop including a data input terminal coupled to a source of signal representative of a first logic level and also including a clock input terminal coupled to said voltage-controlled oscillator, and also including an output terminal, for, when said D flip-flop is in a reset state, gating said first logic level to said output terminal of said D flip-flop in response to a transition of said oscillations, said D flip-flop further including a Reset input terminal;

an RS flip-flop including a set input terminal coupled to said output terminal of said D flip-flop, said RS flip-flop further including a Reset input terminal, and also including an output terminal coupled to said control input terminal of said power switch for driving said switch during those intervals in which said RS flip-flop is in a reset state;

a pull-up resistor coupled to said Reset input terminal of said RS flip-flop and to a source of signal representative of said first logic level;

second comparator means coupled to said current sensing means and to a source of reference signal representative of a minimum current condition, and also including an output terminal coupled to said Reset input terminal of said RS flip-flop, for assuming a second logic level at said output terminal of said second comparator means in response to a zero value of said current-representative signal, and for assuming a high impedance condition at said output terminal of said second comparator means in response to a nonzero value of said current-representative signal;

hysteresis means including a first input terminal coupled to said first comparator means, a second input terminal coupled to said current sensing means, and an output terminal capable of assuming said second logic state and an open-circuit state, said output terminal being coupled to said Reset input terminal of said RS flip-flop, for switching said output terminal to said open-circuit state when said current-representative signal reaches a predetermined amount above said signal representative of the average of said current-representative signal, and for switching said output terminal to said second logic level under one of the conditions that (a) said current-representative signal reaches a predetermined value less than said signal representative of the average of said current representative signal, and (b) said output terminal of said second comparator means assumes said second logic level; and pulse generating means coupled to said output terminal of said RS flip-flop for generating a pulse in response to a transition of a particular polarity at said output terminal of said RS flip-flop, and coupled to said Reset input terminal of said D flip-flop for coupling said pulse as a reset pulse to said D flip-flop in response to each said transition of a particular polarity.

2. A circuit according to claim 1 wherein said current-sensing means comprises a current sensing resistor serially coupled with said series circuit.

3. A circuit according to claim 1 wherein said frequency of said voltage controlled oscillator increases in response to increasing magnitudes of said error signal.

4. A circuit according to claim 1 further comprising:
a source of reference voltage;
a voltage divider coupled to said source of reference voltage, and to said current sensing means and including a tap coupled to said first input terminal of said hysteresis means.

* * * * *